Aug. 17, 1943.   H. D. WILSON   2,326,988
GATE VALVE
Filed Dec. 24, 1941
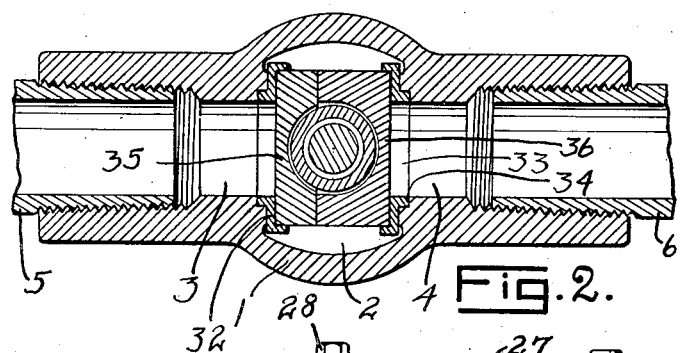
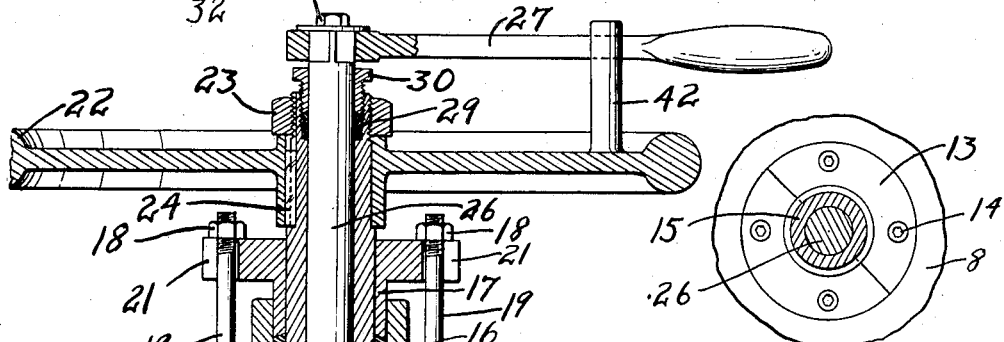
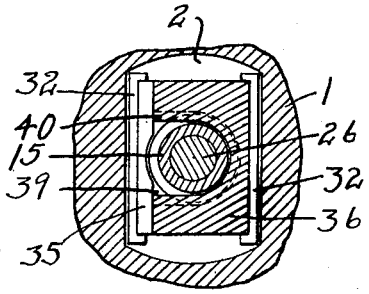
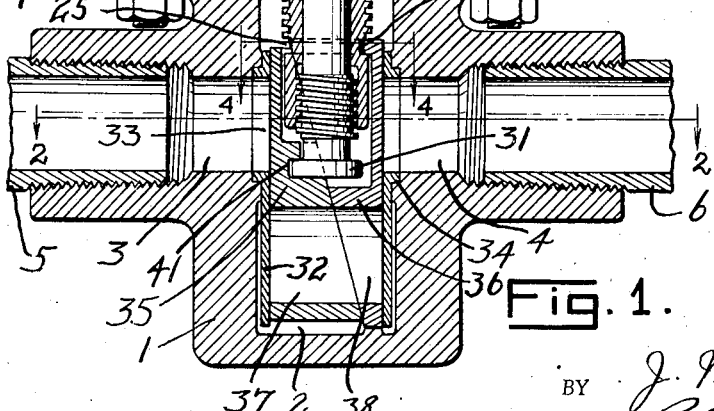
Fig. 1.   H. D. Wilson.
INVENTOR.

Patented Aug. 17, 1943

2,326,988

UNITED STATES PATENT OFFICE 2,326,988

GATE VALVE

Hillsman D. Wilson, Houston, Tex., assignor to Howard Smith Company, Houston, Tex., a corporation of Texas Application December 24, 1941, Serial No. 424,227

5 Claims. (Cl. 251—69)

This invention relates in general to valves and more particularly has reference to gate valves.

The usual gate valve has a single unitary gate or closure member adapted to be forced tightly against its seat when in closed position. Such valves are difficult to manipulate because as they approach closed position they engage their seats with increasing tightness and when seated there is not only the friction due to pressure against them which hinders them from being opened, but also the natural friction due to the tight engagement between the gate and its seat due to the mechanical force with which the gate is held against its seat. Efforts have been made to solve the problem by providing a valve with a composite gate having opposed wedge shaped parts and to provide special mechanisms for moving such parts with respect to each other to wedge the gate against its seat when it is closed. Such devices have, however, been bunglesome and impractical and have not avoided the difficulty of starting the gate at times while it is still tightly seated.

It is therefore a general object of this invention to provide a gate valve, the gate of which may be positively loosened before opening or closing movement is begun.

It is a further object to provide a valve of the character described in which the gate may be forced against its seat at any position whether open, closed or intermediate.

A further object of this invention is to provide a valve of the gate type in which the gate comprises a pair of wedge-shaped closure members assembled with the thick end of one adjacent the thin end of the other and relatively movable to vary the composite thickness of the assembly, and to provide means for positively moving one of said members with respect to the other to lock or unlock the gate with respect to its slideway.

Still another object of this invention is to provide a valve of the gate type in which the gate comprises a pair of wedge-shaped closure members assembled with the thick end of one adjacent the thin end of the other and relatively movable to vary the composite thickness of the assembly, and to provide means acting directly between said members for moving one with respect to the other, and additional means for moving the members as a single unit toward or away from closed position.

Other objects will appear hereinafter in the following description and in the appended drawing.

In the drawing:

Fig. 1 is a vertical longitudinal sectional view of a valve constructed according to the present invention.

Fig. 2 is a sectional view taken on line 2—2 of Fig. 1.

Fig. 3 is a fragmentary sectional view taken on line 3—3 of Fig. 1.

Fig. 4 is another fragmentary sectional view taken on line 4—4 of Fig. 1.

As illustrated in the drawing, the valve comprises a casing 1 having a gate chamber 2, the walls of the latter having inlet and outlet ports 3 and 4 formed therein. Of course it is obvious that either of these ports may be the inlet or outlet. The outer portions of ports 3 and 4 are threaded to receive conduits 5 and 6.

It will be observed that the lower end of the valve casing is closed and that the upper end is open. Surrounding the upper open end of the valve casing is a flange 7 provided with a plurality of bolt receiving openings and having a gasket receiving groove formed in its upper surface. A cover 8 is mounted on said flange 7 and is secured thereto by bolts 9 passing through openings in the flange of cover 8 registering with the openings in flange 7.

The flange of cover 8 has a recess in its lower face registering with the recess in flange 7 and cooperating therewith to receive a gasket 10.

Cover 8 has a small duct 11 extending therethrough and communicating with the space enclosed by the gasket 10. At its outer end the duct 11 is provided with a pressure grease gun fitting 12 of a type available and having a check valve therein. This construction enables the gate chamber 2 to be filled with lubricating grease which will lubricate the moving parts of the valve and facilitate their movement.

Cover 8 has a central opening therein which is enlarged near the lower face thereof to receive the internally thread insert 13, secured in place by screws 14. Extending through the opening in the cover 8 and the insert 13 is a tubular valve stem 15 having threads on the exterior thereof cooperating with those in the insert.

The upper tubular portion of cover 8 has the bore therethrough enlarged to provide a space for packing 16 which is compressed by the plunger 17 forced into the enlarged bore by tightening of the nuts 18 on the bolts 19. The bolts 19 are secured to lugs 20 on the cover 8 and pass through slots 21 in a flange on the upper end of plunger 17.

On the upper end of stem 15 is secured a hand wheel 22 by means of a nut 23 and a key 24. Adjacent its lower end stem 15 is provided with a groove 25 for securing a closure member thereto.

A second stem 26 is mounted within tubular stem 15 and has external threads cooperating with internal threads within the lower end of stem 15 whereby upon relative rotation of the stems relative axial displacement will take place. Lever 27 is secured on the upper squared end of stem 26 by a screw 28. Stem 26 is sealed with stem 15 by packing 29 compressed by threaded plunger 30. At the lower end of stem 26 a flange 31 is provided to cooperate with one of the closure members.

Within the gate chamber 2 is mounted two gate tracks or linings 32 having openings 33 surrounded by flanges 34 which are received in suitable enlargements of the ports 3 and 4. It will be noted that the gate tracks 32 engage the walls of the gate chamber 2 only within and about the ports 3 and 4. Thus only these portions of the gate chamber need be machined.

Slidably mounted in the gate chamber 2 is the gate formed of the two wedge-shaped closure members 35 and 36 which are positioned with the thick end of one adjacent the thin end of the other.

As shown in Fig. 1 the lower thick end of closure member 35 and the lower thin end of closure member 36 have flow openings 37 and 38 respectively formed therein which are brought into register with each other and the ports 3 and 4 when the valve is in open position.

One of the essential features of this invention is the manner in which the wedge-like closure members are positioned so that a relative displacement in their general direction of movement will enable the outer surfaces which are in engagement with the tracks to be pressed against said tracks or have the pressure relieved. For this purpose closure member 36 which is of hollow construction is provided with recess 39 in its upper end surface. The recess is surrounded by a U-shaped flange 40 which enters into the groove or recess 25 on the stem 15 adjacent its lower end. This connection enables the stem to be rotated and any axial movement of the stem will be imparted to the closure member 36 causing it to be displaced with the stem.

Closure member 35 has a recess 41 of U-shape formed therein to receive the flanged end 31 of the stem 26. The connection between stem 26 and closure member 35 permits the stem to rotate but any axial movement of the stem effects a displacement of the member 35.

With the above described construction it will be appreciated that rotation of the stems 15 and 26 together will cause the two closure members 35 and 36 to be simultaneously displaced over the tracks 32 from opened to closed position or vice versa.

After the gate comprising the two wedge-like closure members is displaced for instance to closed position lever 27 may be moved relative to hand wheel 22 to effect relative displacement of the closure member 35 upwardly relative to closure member 36. This forces the outer surfaces of both closure members tightly against the tracks 32 and seals the closure members against the port openings.

When it is desired to open the valve, lever 27 is rotated in the opposite direction to displace member 35 downwardly to relieve the pressure of the closure members against the tracks 32. This enables the closure members to be more easily displaced along the tracks 32.

A pin 42 is carried by hand wheel 22 to engage lever 27. This pin abuts lever 27 and causes it to move with the wheel 22 but permits the lever to be moved through an arc of nearly 360° free of the wheel. Thus a lost motion connection is provided between the hand wheel 22 and lever 27.

Instead of moving lever 27 to free the closure members, hand wheel 22 may be first actuated and when the pin 42 strikes the lever 27 the latter will be moved with the wheel.

From the foregoing it will be realized that the present invention provides a structure free from the prior art disadvantages and which effectively serves to enable the easy opening and closing of valves in high pressure conduits.

Having described my invention, I claim:

1. A gate valve comprising a valve casing having a gate chamber and inlet and outlet flow ports in opposite walls of said gate chamber, a gate slidably mounted in said gate chamber and being formed of two cooperating abutting port closure members one for each port, the abutting surfaces of said closure members being inclined relatively to the plane in which said gate slides, a tubular stem extending into the casing and connected at its inner end to one of said closure members, a second stem mounted within the tubular stem and connected at its inner end to the other closure member, means for displacing said tubular stem to slide the closure member connected thereto, separate means for displacing the second stem to slide the closure member connected thereto, and lost motion means to limit relative displacement between said stems.

2. A gate valve comprising a valve casing having a gate chamber and inlet and outlet flow ports in opposite walls of said gate chamber, a gate slidably mounted in said gate chamber and being formed of two cooperating abutting port closure members one for each port, the abutting surfaces of said closure members being inclined relatively to the plane in which said gate slides, a tubular stem extending into the casing and having an exteriorly threaded portion cooperating with a threaded portion of said casing, means connecting the end of said stem with one of the closure members, a second stem mounted within said tubular stem, cooperating threads on the interior of the tubular stem and on the exterior of the second stem, means connecting the inner end of the second stem with the other closure member, and means for rotating said stems.

3. A gate valve comprising a valve casing having a gate chamber and inlet and outlet flow ports in opposite walls of said gate chamber, a gate slidably mounted in said gate chamber and being formed of two cooperating abutting port closure members one for each port, the abutting surfaces of said closure members being inclined relatively to the plane in which said gate slides, a tubular stem extending into the casing and having an exteriorly threaded portion cooperating with a threaded portion of said casing, means connecting the end of said stem with one of the closure members, a second stem mounted within said tubular stem, cooperating threads on the interior of the tubular stem and on the exterior of the second stem, means connecting the inner end of the second stem with the other closure member, means for rotating the tubular stem, means for rotating the second stem, and a lost motion connection between said rotating means.

4. A gate valve comprising a valve casing having a gate chamber and inlet and outlet flow ports in opposite walls of said gate chamber, a gate track mounted on each of said opposite walls and having an opening registering with the port in each wall, a gate formed of two abutting cooperating wedge-like closure members, each closure member having a surface slidably engaging one of said tracks, said closure members being assembled with a thin portion of one adjacent a thick portion of the other so that the track engaging surfaces of the two closure members are substantially parallel to the surfaces of their respective tracks, a tubular stem extending into the casing and having an exteriorly threaded portion cooperating with a threaded portion of said casing, means connecting the end of said stem with one of the closure members, a second stem mounted within said tubular stem, cooperating threads on the interior of the tubular stem and on the exterior of the second stem, means connecting the inner end of the second stem with the other closure member, and means for rotating said stems.

5. A gate valve comprising a valve casing having a gate chamber and inlet and outlet flow ports in opposite walls of said gate chamber, a gate track mounted on each of said opposite walls and having an opening registering with the port in each wall, a gate formed of two abutting cooperating wedge-like closure members, each closure member having a surface slidably engaging one of said tracks, said closure members being assembled with a thin portion of one adjacent a thick portion of the other so that the track engaging surfaces of the two closure members are substantially parallel to the surfaces of their respective tracks, a tubular stem extending into the casing and having an exteriorly threaded portion cooperating with a threaded portion of said casing, means connecting the end of said stem with one of the closure members, a second stem mounted within said tubular stem, cooperating threads on the interior of the tubular stem and on the exterior of the second stem, means connecting the inner end of the second stem with the other closure member, means for rotating the tubular stem, means for rotating the second stem, and a lost motion connection between said rotating means.

HILLSMAN D. WILSON.